United States Patent [19]

Tufano et al.

[11] 4,262,181
[45] Apr. 14, 1981

[54] SNAP-IN SWITCH HOUSING

[75] Inventors: Anthony Tufano, Rosedale; Wolfgang F. Bienwald, Melville, both of N.Y.

[73] Assignee: Leviton Manufacturing Company, Inc., Little Neck, N.Y.

[21] Appl. No.: 142,546

[22] Filed: Apr. 21, 1980

Related U.S. Application Data

[63] Continuation-in-part of Ser. No. 14,658, Feb. 23, 1979, abandoned.

[51] Int. Cl.³ .............................................. H01H 9/02
[52] U.S. Cl. .................................... 200/296; 248/27.1
[58] Field of Search ............... 200/295, 296; 248/27.1, 248/27.3

[56] References Cited

U.S. PATENT DOCUMENTS

| | | | |
|---|---|---|---|
| 2,193,268 | 3/1940 | Catron et al. | 200/296 |
| 3,116,960 | 1/1964 | Olsson et al. | 248/27.3 |
| 3,298,641 | 1/1967 | Puerner | 248/27.3 |
| 3,350,531 | 10/1967 | Koepke | 200/296 |
| 3,668,356 | 6/1972 | Kekas | 200/295 |

Primary Examiner—John W. Shepperd
Attorney, Agent, or Firm—Paul J. Sutton

[57] ABSTRACT

A snap-in switch housing for a manually operated electrical switching device has a bushing in which a control shaft for the device is journaled molded from a plastic material. Included on the exterior of the bushing are resilient prongs having cam surfaces which cause the prongs to be pushed inwardly as the bushing is inserted through an aperture in a mounting plate for the switch device with barbs on the prongs preventing retraction of the switch housing from the mounting plate after insertion. The resiliency of the plastic material from which the bushing is molded causes the prongs to maintain a position in which the housing is securely mounted to the mounting plate.

1 Claim, 5 Drawing Figures

SNAP-IN SWITCH HOUSING

This application is a continuation-in-part patent application of our pending application Ser. No. 14,658 filed on Feb. 23, 1979 now abandoned and entitled "SNAP-IN SWITCH HOUSING".

BACKGROUND OF THE INVENTION

Numerous electrical appliances used in commercial and residential environments employ rotary electrical switches which are manually operated by turning, pushing or pulling a control shaft or lever operatively connected to the switch contacts. In assembling the appliances in which such switches are used, it is desirable to shield the switch contact mechanism and the electrical connection to it from the user while permitting access of the user to the control shaft or lever. Such switches are normally mounted by placing the contact mechanism behind a protective plate which normally comprises a surface of the appliance with the control shaft or lever projecting through an aperture in the protective plate. The switch is held affixed to the protective plate with retraction of the control shaft or lever back through the aperture prevented by attaching a fastener to the bushing in which the control shaft is journaled or to the surface of the switch mechanism housing which faces the shielding plate. In some switches of the prior art, the bushing which circumscribes the switch control shaft is threaded to receive a nut with or without a washer which is passed over the shaft from the access side of the plate and threaded onto the bushing to frictionally engage the access surface of the shielding plate. In other switches of the prior art, screw holes are pre-drilled in the surface of the switch housing adjacent the control shaft or lever and aligning apertures are provided in the shielding plate through which screws may be passed to hold the switch housing in place. Two such screw holes are normally necessary to prevent rotation of the switch housing relative to the shielding plate. Some switch housings utilize one threaded hole to receive a screw and achieve rotational stability through the use of a hook adapted to be received in an eye or slot on or adjacent to the shielding plate.

To enhance insulation and protection from electrical shock, some switches of the prior art utilize plastic components in those portions of the switch housing which come in contact with the shielding plate which is often metal and conductive. The use of screws and nuts with such switch housings results in a tendency for the threads on the plastic bushings or in the holes drilled in the plastic members of the housing to become stripped necessitating that the entire switch assembly be discarded as it is generally not economically feasible to repair such switching devices.

It is also time consuming to align switch mechanisms mounted in housings known to the prior art in proper alignment with fastener holes, eyes or slots and to then thread one or more screws, nuts or washers onto the switch mechanisms to affix them in place.

Another disadvantage of the prior art switches discussed above is that, when used in an environment which is subject to vibration as is commonly the case with electrical apparatus stored in moving vehicles or adjacent motor driven machinery the nuts and screws have a tendency to loosen whereby the switch mechanism can become disengaged from the shielding plate and fall with exposed live wires and contacts against other conducting surfaces, some of which may be energized, thereby resulting in a potentially hazardous condition and, in any event, requiring disassembly of the appliance to restore the switch to its proper position or replace it.

SUMMARY OF THE INVENTION

The above-described problems associated with prior art switching devices are overcome by the invention disclosed and claimed herein. Briefly, the invention relates to a housing in which a switching mechanism generally employing a rotary control shaft or possibly utilizing a reciprocating plunger or lever is mounted. On the surface of the housing from which the control shaft protrudes there is a boss which acts as a bushing for the control shaft and on which there are integrally molded barbed prongs which have respective cam surfaces for urging the prongs toward the control shaft when the shaft is passed through an aperture in a mounting plate until a shoulder on each of the barbs is simultaneously passed through the aperture at which time the resilient prongs snap back and are restored to their normal position spaced from the control shaft. The bushing and resilient prongs are made of a plastic having good insulating properties and a form sustaining resiliency. This permits the housing which holds the switch mechanism to be snapped into an aperture on the mounting plate of the appliance with which the switch mechanism is used. Once snapped into place, the housing cannot be retracted from the aperture in the plate unless all of the prongs are simultaneously urged inwardly while an axial force is applied to the switch housing thereby precluding unwanted unfastening of the switch housing from the mounting plate. Moreover, no metallic component engages the mounting plate thereby facilitating compliance with requirements for double insulated equipment and protecting the user from possible electrical shock upon occurrence of a fault in the equipment.

It is, therefore, an object of the invention to provide a housing for supporting a manually actuated switching device on the mounting plate of an appliance.

Another object of the invention is to provide a housing for a switching device which can be attached to the mounting plate of an appliance without need for any tools or external fasteners.

Still another object of the invention is to provide a housing for a switching device which can be applied to the mounting plate of an appliance very rapidly.

A further object of the invention is to provide a housing for a switching device which fully insulates the manually actuated portion of a switching device from the mounting plate to which the housing is affixed.

A still further object of the invention is to provide a housing for a switching device which, once affixed to the mounting plate of an appliance, will not loosen or separate unless separation is intentionally accomplished.

Other and further objects of the invention will be apparent from the following drawings and description of a preferred embodiment in which like parts are designated by like reference numerals.

DESCRIPTION OF THE PREFERRED EMBODIMENT

Figure 1:
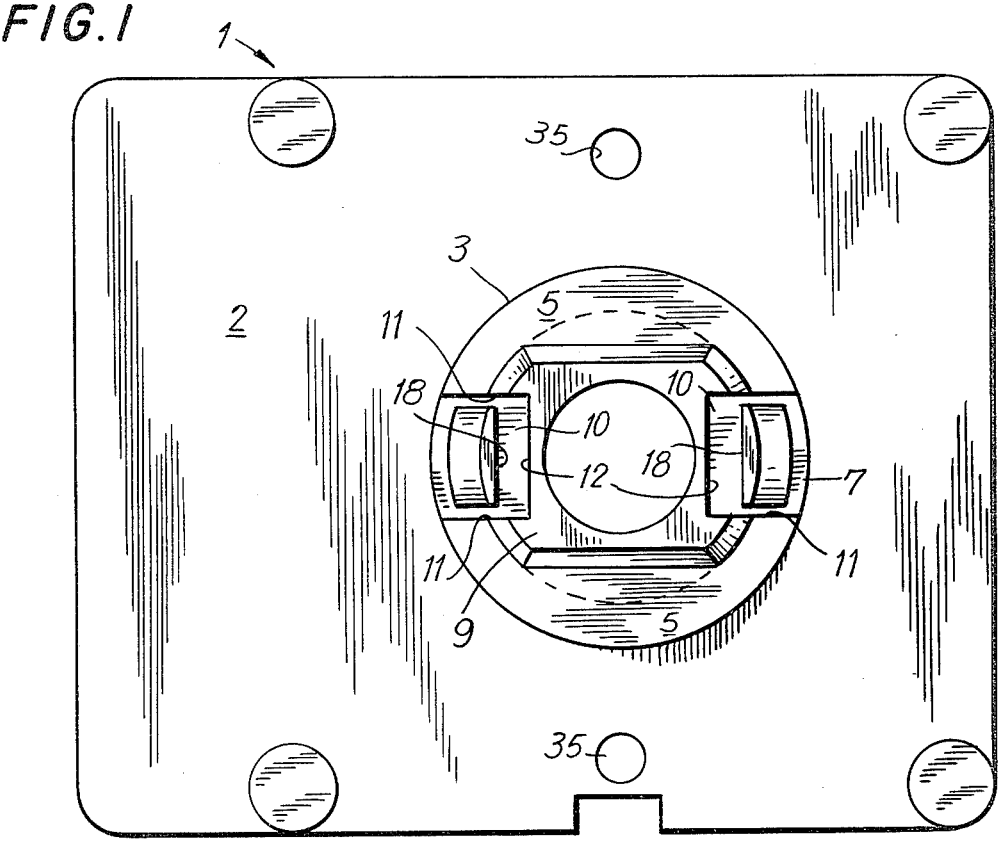
FIG. 1 is a front elevation of the apparatus of the invention.
Figure 2:
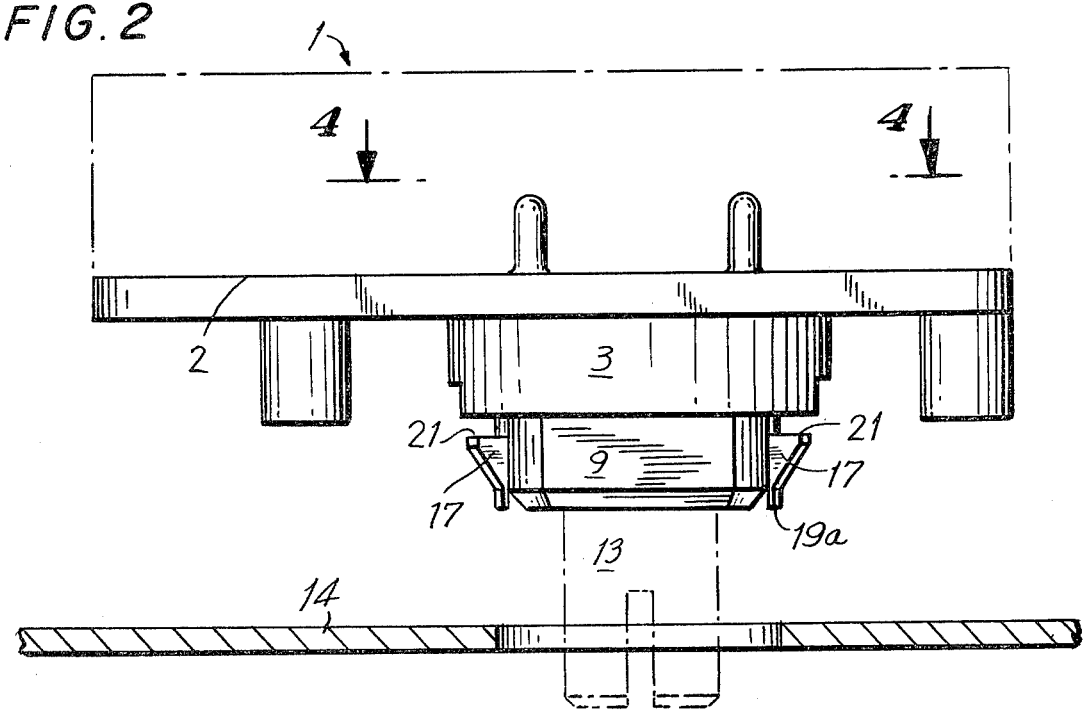
FIG. 2 is a top view of the apparatus of the invention just prior to being installed in its intended environment.
Figure 3:
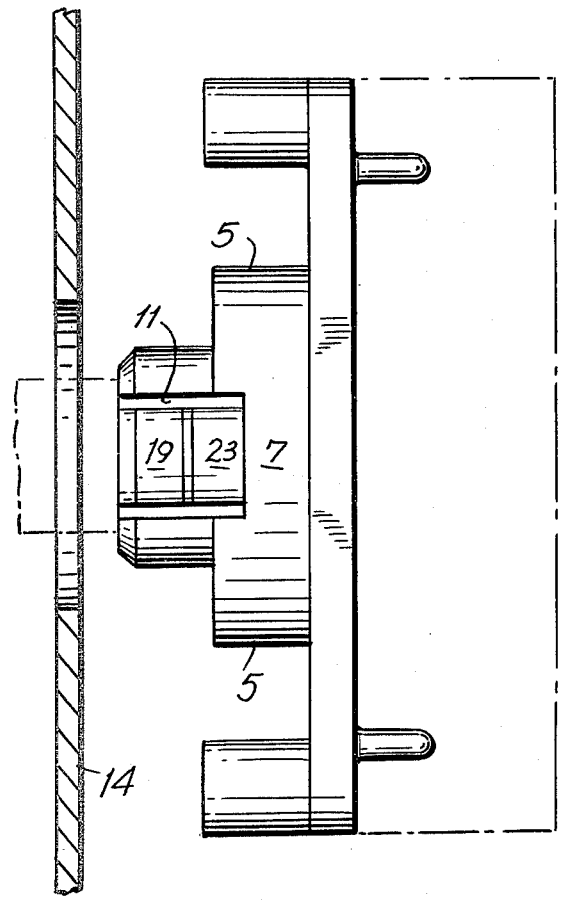
FIG. 3 is a side elevation of the apparatus of the invention immediately prior to installation in its intended environment.
Figure 4:
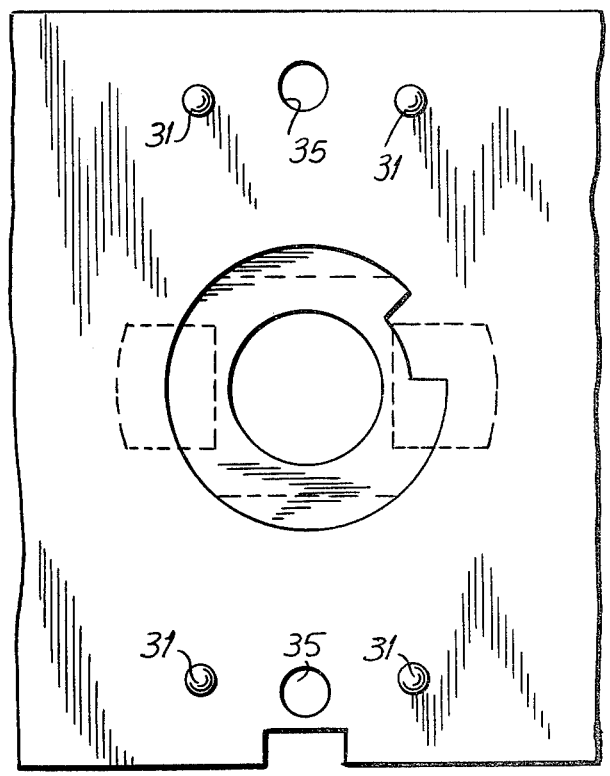
FIG. 4 is a rear elevation of the apparatus of the invention as viewed from plane 4—4 shown in FIG. 2.

Referring now to FIGS. 1, 2 and 3 of the drawings, a switch housing 1 has a front surface 2 upon which there is mounted or, preferably, on which there is integrally formed a hollow boss 3 having a cylindrical exterior and a cylindrical bore. The boss 3 has opposite major arcuate segments 5 and minor intermediate opposite arcuate segments 7.

Mounted adjacent the cylindrical boss 3 and, preferably, integrally formed with it, is another boss 9 which has a cross section that is substantially square with rounded corners and two of its opposing sides having respective notches 10 defining opposing side walls 11 and transverse rear walls 12 connecting the side walls 11.

The outer boss 9 has a cylindrical bore smaller than and coaxial with the cylindrical bore of the inner boss 3. A control shaft 13 is journaled in the cylindrical bore of the outer boss 9 with one end connected to switching contacts (not shown) within the housing 1 and the other end extending beyond the outer boss 9 and slotted to receive a control knob (also not shown). The outer edges of the outer boss 9 are beveled to facilitate insertion of the outer boss 9 through an aperture in a mounting plate 14.

Mounted on the outer surface of the minor arcuate segments 7 of the inner boss 3 are respective resilient prongs 17 having opposing surfaces 18 normally parallel to and spaced from respective notch defined rear walls 12 and having barbed portions including tapered cam surfaces 19 extending inwardly from the outermost edges of the prong members 17 and terminating at shoulders 21. Extending from the shoulders 21 inwardly to the outer surface of the inner boss 3 are recessed peripheral surfaces 23 of the prongs 17.

Extending inwardly from the rear of the housing member on which the boss 3 is seated are four alignment pins 31 which are received by apertures defined by contacts located in the contact housing so that the contacts are captively maintained in an operable condition. Extending outwardly from front surface 2 are four spacer posts shown in FIGS. 1–5 which engage the outside of mounting plate 14 in a gripping action of plate 14 with shoulders 21, best seen in FIG. 5. Apertures 35 are provided for receiving a suitable fastener to attach the housing cover portion to the body of the housing.

Figure 5:
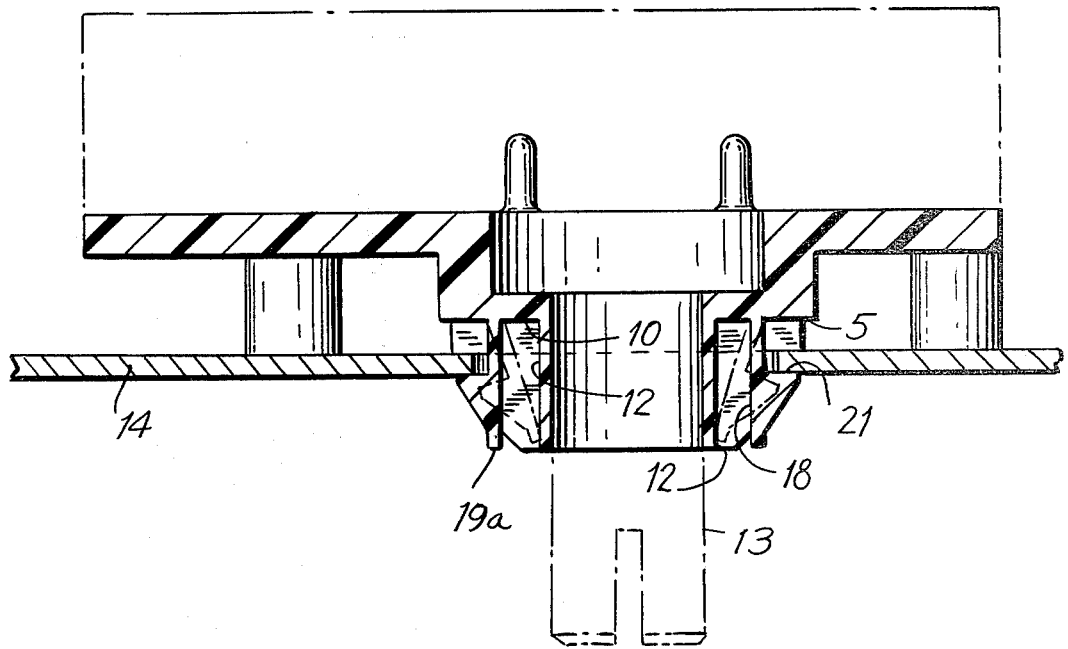
FIG. 5 is a sectioned top view of the apparatus of the invention after installation in its intended environment.

In use, a rotary switch having a contact mechanism disposed in a housing according to the invention and a control shaft 13 extending therefrom is placed behind a supporting plate 14 with the shaft 13 aligned with an aperture in the mounting plate 14 as shown in FIGS. 2 and 3 of the drawings. The aperture is preferably rectangular in shape and of dimension to conform to the outer dimensions of the rectangular boss 9 with two edges of the rectangular opening being spaced apart a distance equal to the spacing of leading locating edges 19a which extend integrally from cam surfaces 19 of the prongs 17. The switch housing is then urged inwardly toward the mounting plate 14 until the cam surfaces 19 engage the respective edges of the aperture in the plate 14. As the housing is continually urged inwardly, a force is exerted on the cam surfaces 19 having a component transverse to the axis of the shaft 13 to cause the resilient prongs 17 to move inwardly until the shoulders 21 of the prongs 17 clear the edges of the aperture in the mounting plate 14 as shown in FIG. 5. Inward movement of the prongs 17 is limited by the opposing rear walls 12 of the rectangular boss 9 so that the prongs are not over-stressed beyond their resiliency as could happen if the aperture were of insufficient size. The prongs are of dimensions such that when they engage the opposing rear walls 12 of the rectangular boss 9 the distance between the shoulders of the opposite prongs is substantially equal to or slightly less than the dimension of the aperture in a parallel direction.

Once the shoulders 21 have cleared the aperture in the plate 14, the prongs are resiliently urged apart and are substantially restored to their original positions with the opposing walls 18 of the prongs being parallel to the opposing rear walls 12 of the rectangular boss 9. The distance between the shoulders 21 and the outer surface of the cylindrical boss 3 is preferably equal to the thickness of the plate 14 so that the switch housing is snugly held within the aperture of the plate 14.

It will be appreciated that variations of an alterations to the disclosed preferred embodiment may be made without departing from the object and spirit of the invention which is to be limited only by the following claims.

What is claimed is:

1. A snap-in control housing for use in conjunction with an appliance or the like having an actuable control member, comprising: a base portion having a first aperture, a first boss portion extending substantially normally from said base portion and having a second aperture at least partially in communication with said first aperture to permit portions of said control member to be journaled within the first aperture of said base portion and said second aperture and to extend beyond said base portion at one end and beyond said first boss at the other end, said first boss being integral with said base portion, a second boss extending substantially coaxially from and integral with said first boss and having perimeter surfaces of substantially non-circular configuration to prevent relative rotation as between the control housing and a mounting surface of the appliance housing member to which the control housing is secured, said second boss being further formed with limiting surfaces spaced from said non-circular surfaces, at least one resilient prong member integral with and extending in substantially parallel spaced relationship with respect to said limiting surfaces of said second boss, said prong member being formed with bearing surfaces and cam surfaces which extend at an angle with respect to said bearing surfaces, said bearing surfaces being disposed in spaced relationship with respect to facing surfaces of said first boss thereby defining a gap of predetermined width therebetween, upon insertion into an aperture in said mounting surfaces the endes defining said aperture causing axial pressure against said cam surface to result in a force component transverse to said axis urging said prong member toward said limiting surfaces, the resiliency of said prong member providing a counter-transverse force normally biased away from said limiting surfaces and tending to restore said prong to its normal position spaced from said boss, and a plurality of spacer post members extending at an angle from and integral with said base portion and terminating in contact surfaces, whereby said contact surfaces engage said mounting surface and said prong member bearing surfaces engage the opposite side of said device housing member mounting surface thereby gripping the device housing member mounting and opposite surfaces therebetween and holding same in spaced relationship with respect to said facing surfaces.

* * * * *